United States Patent
Chambre et al.

(10) Patent No.: US 10,613,230 B2
(45) Date of Patent: Apr. 7, 2020

(54) SPACE BASED OR AERONAUTICAL AUGMENTATION SYSTEM WITH SIMPLIFIED MANAGEMENT OF ITS NAVIGATION MESSAGES

(71) Applicant: THALES, Courbevoie (FR)

(72) Inventors: Eric Chambre, Toulouse (FR); Céline Benassy Foch, Toulouse (FR); Bernard Charlot, Toulouse (FR)

(73) Assignee: THALES, Courbevoie (FR)

( * ) Notice: Subject to any disclaimer, the term of this patent is extended or adjusted under 35 U.S.C. 154(b) by 573 days.

(21) Appl. No.: 15/183,637

(22) Filed: Jun. 15, 2016

(65) Prior Publication Data

US 2016/0370465 A1 Dec. 22, 2016

(30) Foreign Application Priority Data

Jun. 17, 2015 (FR) .................................. 15 01261

(51) Int. Cl.
*G01S 19/02* (2010.01)
*G01S 19/08* (2010.01)
*G01S 19/03* (2010.01)

(52) U.S. Cl.
CPC .............. *G01S 19/02* (2013.01); *G01S 19/08* (2013.01); *G01S 19/03* (2013.01)

(58) Field of Classification Search
CPC ........... G01S 19/02; G01S 19/03; G01S 19/08
(Continued)

(56) References Cited

U.S. PATENT DOCUMENTS 6,801,854 B1 * 10/2004 Pemble .................. G01S 19/08
701/470
7,110,883 B1 * 9/2006 Pemble .................. G01S 19/07
342/357.29
(Continued)

FOREIGN PATENT DOCUMENTS

EP  1 494 042 A1  1/2005
EP  2 579 062 A1  4/2013
EP  2 693 232 A1  2/2014

OTHER PUBLICATIONS

J. Westbrook et al., "An Introduction to the EGNOS Central Processing Facility (CPF)," 56th Annual Proceedings of the IAIN World Congress and the 56th Annual Meeting of the Institute of Navigation, Jun. 28, 2000, pp. 6-13, XP056001161.
(Continued)

*Primary Examiner* — Chuong P Nguyen
(74) *Attorney, Agent, or Firm* — Baker & Hostetler LLP

(57) ABSTRACT

A space based or aeronautical augmentation system comprises space based or aeronautical broadcasting means adapted for retransmitting streams of messages NOF m.j transmitted by broadcasting ground stations, one or more observation and reception ground stations for signals transmitted by the satellites of the GNSS global navigation system and by the N space based or aeronautical broadcasting means. The space based or aeronautical augmentation system further comprises K computation centres, located on geographically remote sites, and each configured to formulate i-th streams of messages NOF i.j, j varying from 1 to j, such that all the data streams NOF i.j, independently of the computation centre CPF#i which formulate them, comprises one and the same sequence of types MTs of messages, which is independent of the space based or aeronautical broadcasting means.

15 Claims, 9 Drawing Sheets

(58) Field of Classification Search
USPC .......................... 342/357.4, 357.45, 357.395
See application file for complete search history.

(56) References Cited

U.S. PATENT DOCUMENTS

| | | | | |
|---|---|---|---|---|
| 7,327,310 | B2* | 2/2008 | Abraham | G01S 5/0036 |
| | | | | 342/357.4 |
| 7,580,381 | B2* | 8/2009 | Michelon | G01S 19/11 |
| | | | | 342/357.29 |
| 7,647,173 | B2* | 1/2010 | Charlot | G01S 19/07 |
| | | | | 342/357.29 |
| 9,063,221 | B2* | 6/2015 | Peyrotte | G01S 19/02 |
| 9,154,216 | B2* | 10/2015 | Trautenberg | H04B 7/18513 |
| 9,247,392 | B2* | 1/2016 | Raghupathy | G01S 19/10 |
| 9,316,739 | B2* | 4/2016 | Bertin De La Hautiere | |
| | | | | G01S 19/38 |
| 9,651,664 | B2* | 5/2017 | Charlot | G01S 19/02 |
| 2012/0208557 | A1* | 8/2012 | Carter | G01S 19/23 |
| | | | | 455/456.1 |
| 2013/0273955 | A1 | 10/2013 | Trautenberg | |

OTHER PUBLICATIONS

J. Westbrook et al., "EGNOS Central Processing Facility architecture and design," GNSS 2000 Conference Edinburgh Scotland, May 1-4, 2000, pp. 1-18, XP002676599.

E. Lacarra et al., "Description and Applications of EDAS (EGNOS Data Access Service)," GNSS 2013-Proceedings of the 26th International Technical Meeting of the Satellite Division of the Institute of Navigation, Sep. 20, 2013, pp. 2228-2242, XP056007426.

\* cited by examiner

SPACE BASED OR AERONAUTICAL AUGMENTATION SYSTEM WITH SIMPLIFIED MANAGEMENT OF ITS NAVIGATION MESSAGES

CROSS-REFERENCE TO RELATED APPLICATIONS

This application claims priority to foreign French patent application No. FR 1501261, filed on Jun. 17, 2015, the disclosures of which are incorporated by reference in their entirety.

FIELD OF THE INVENTION

The present invention relates to a space based or aeronautical augmentation system, adapted for improving the precision and the reliability of the data delivered by a satellite navigation system, and simplified in respect of the management of its navigation messages.

The present invention also relates correspondingly to a method of simplified management of the navigation messages of the space based or aeronautical augmentation system according to the invention.

BACKGROUND

Space based augmentation systems or SBASs are satellite radionavigation systems intended to supplement systems ensuring a basic satellite navigation service or GNSS for "Global Navigation Satellite Systems" such as the GPS, GALILEO, or GLONASS systems so as jointly to provide superior performance in terms of location precision, availability and continuity of service and integrity of the information provided.

These systems transmit on one or more satellites (typically geostationary) an L-band signal transporting in particular a string of navigation messages or NOF for "Navigation Overlay Frame", at a rate of one message per second.

This signal and the string of messages transmitted are defined by an international standards document RTCA MOPS DO-229-D, entitled "Minimum Operational Performance Standards for Global Positioning System/Wide Area Augmentation Equipment".

The known basic architecture of such a space based augmentation system is described in the European patent application published under the number EP 2 579 062 A1.

According to this architecture, a signal, transmitted by satellites of a constellation of a GNSS satellite navigation system, is received by a set of reception and observation ground stations, or RIMSs for "Ranging and Integrity Monitoring Stations", dispersed over a wide territory (for example Europe). These RIMS stations transmit signals corresponding to the signals received, through a long-distance network or WAN for "Wide Area Network", to a computation centre or CPF for "Central Processing Facility". This computation centre formulates corrections and integrity data making it possible to provide the user with the required performance of the navigation service and transmits at each computation cycle lasting a duration of a second a part thereof in the form of digital navigation messages or NOF for "Navigation Overlay Frame" which are transmitted through the long-distance network to a broadcasting ground station or NLES for "Navigation Land Earth Station". This broadcasting ground station transmits signals corresponding to the signals received, to geostationary satellites which rebroadcast them via broadcasting signals to receivers of users of the service.

The receivers of the users simultaneously receive the first signals of the geostationary SBAS satellites, generally geostationary, and the second signals of the satellites of the constellation of the GNSS satellite navigation system, and each compute their position with the aid of these two types of signals. It should be noted that the RIMS reception and observation ground stations also receive these signals and that they transmit the digital navigation messages NOF thereof to the computation centre CPF jointly with the information received from the satellites of the GNSS constellation.

The computation cycle described hereinabove is performed by the space based augmentation system SBAS in a repetitive manner typically every second.

The implementation is often pipelined, each element performing during a computation cycle the processing of the data which will be processed by the following element during the following cycle.

It should be noted that at the user level the knowledge of a string of streams of navigation messages NOF of a certain length (typically several minutes) is necessary to compute the positioning thereof. The coherence of the various streams of successively transmitted navigation messages NOF is therefore a major issue: this is why one speaks of a string of transmitted navigation messages NOF, and not of isolated navigation messages NOF.

A basic implementation such as this does not make it possible to provide the very short-term availability and the continuity that are expected by the users of such a system: typically an availability of the order of 99% and a probability of loss of continuity of better than $10^{-5}$/h are characteristic of the expected performance for the currently most widespread use, namely that of civil aeronautics.

In particular a fault with the main computation centre, that is to say with the computation centre intended to operate nominally in master mode, gives rise to the interruption of the transmissions of the stream of navigation messages or NOF and an immediate loss of continuity with an impact on availability.

It is known to use SBAS space based augmentation systems with redundancy, the EGNOS system being an example of one such redundant system 2, represented here in a simplified manner in FIG. 1 with only two computation centres 12, 14, geographically remote from one another, instead of the three computation centres used in practice.

According to FIG. 1, the computation centres 12, 14, installed respectively on a first site called "site 1" and on a second site called "site 2", receive from the set 20 of RIMS stations and respectively in parallel the navigation data signals of an integer number N, here at least equal to three, of geostationary satellites 22, denoted NOF 1, NOF 2, . . . , NOF N, and the navigation signals of the satellites 24 of the GNSS constellation.

As a function of these received signals, the first and second computation centres 12, 14 independently formulate their streams of respective navigation messages, NOF 1.1, NOF 1.2, . . . , NOF 1.N for the first computation centre 12, NOF 2.1, NOF 2.2, . . . , NOD 2.N for the second computation centre 14, which are each transmitted to a broadcasting ground station NLES#j, that is to say the broadcasting station having the same index j as the signals NOF 1.j, NOF 2.j. For example, the first computation centre 12 transmits the stream of messages NOF 1.2 to the broadcasting station of rank 2 while the second computation centre 14 transmits the stream of messages NOF 2.N to the station of rank N.

Each broadcasting ground station NLES#j, j varying from 1 to N, selects one of the streams of navigation messages from among the streams of messages NOF1.j, NOF 2.j that it receives and transmits it to the receivers of users, by way of a geostationary satellite of the same index j with which the broadcasting ground station NLES#j is associated through the plan of the transmission resources of the said satellite.

Each broadcasting ground station NLES#j also receives, continuously from each computation centre 12, 14, integrity data representative of the integrity of the streams of messages NOF 1.j, NOF 2.j, received by the station NLESj and dispatched by the first and second computation centres 12, 14, these integrity data being denoted respectively by DI 1.j for the stream of messages NOF 1.j transmitted by the first computation centre 12 and by DI 2.j for the stream of messages NOF 2.j transmitted by the second computation centre 14.

Each computation centre 12, 14 comprises respectively a unit 52, 54 for processing and formulating the streams of navigation messages, the streams of messages NOF 1.j being formulated by the unit 52 of the first computation centre 12 or CPF#1, and the streams of messages NOF 2.j being formulated by the unit 54 of the second computation centre 14 or CPF#2.

Each computation centre 12, 14 comprises respectively an integrity data formulation unit 62, 64 for the formulation of the integrity data DI 1.j, DI 2.j.

In case of fault with one of the computation centres 12, 14, each broadcasting ground station NLES#j selects the message of one of the other computation centres or CPFs in a good operating state, thus maintaining continuity of transmission of navigation message streams or NOF destined for the receivers of users.

The computation centres 12, 14 are situated on different geographical sites which are sufficiently far apart to avoid a fault that would cause complete breakdown in case of a local major problem (fault with the communication network over a country, major industrial accident, natural catastrophe, . . . ).

The corresponding conventional architecture of the SBAS system and its corresponding method of implementation such as are described hereinabove and in FIG. 1 use an approach based on an independence between the streams of messages broadcast by the space based broadcasting means, namely the satellites 22.

Thus, in general a navigation message, which is substantially different especially in terms of sequence of message types, is generated by geostationary satellite, thereby giving rise within one and the same computation centre to a proliferation of independent processing pathways or channels, associated with the streams of messages received by the RIMS reception stations 20, as a function of the number of geostationary satellites, and also an increase in the exchanges of signals between the various functional entities of the EGNOS system for the analysis of possible faults.

It is thus sought to decrease the volume of the analyses to be performed on the observation data received by the RIMS reception and observation stations when the number of geostationary satellites increases, this decrease having already to be effective when the number of satellites goes from one to two.

The technical problem is to decrease the complexity of the architecture of an SBAS system, in particular the complexity of the architecture of its computation centres or CPFs when the number of its broadcasting means, for example geostationary satellites, increases without impairing the usual performance in terms of precision, reliability, continuity and availability, conventionally demanded of an SBAS system.

Correspondingly, the technical problem is to decrease the complexity of the method for analyzing the GNSS navigation data and the SBAS navigation data and of the method for generating the streams of SBAS navigation messages, implemented by the SBAS system when the number of its broadcasting means increases, without impairing the usual performance in terms of precision, reliability, continuity and availability, conventionally demanded of an SBAS system.

SUMMARY OF THE INVENTION

For this purpose, the subject of the invention is a space based or aeronautical augmentation system, adapted for improving the precision and the reliability of the data delivered by a global satellite navigation system comprising:

a space based or aeronautical segment having a first integer number N, greater than or equal to two, of space based or aeronautical broadcasting means GEO#j, furnished respectively with their transmit/receive means adapted for transmitting data received respectively from associated broadcasting ground stations NLES#j, destined for one and the same predetermined geographical zone;

a ground infrastructure segment comprising

N transmission ground stations NLES#j, associated respectively with the N space based or aeronautical broadcasting means GEO#j so as to transmit navigation data to them and numbered respectively by a first integer index j varying from 1 to N, and at least one observation and reception ground station for signals transmitted by at least one satellite of the global satellite navigation system and by the N space based or aeronautical broadcasting means GEO#j, a second number K, greater than or equal to 2, of computation centres CPF#i, made mutually redundant, numbered respectively by a second index i varying from 1 to K, and configured to compute, on the basis of the signals transmitted by the observation and reception ground station or stations, streams or sequences of navigation messages NOF i.j, i varying from 1 to K and j varying from 1 to N, that are ready to be transmitted respectively according to the index j to the N broadcasting ground stations NLES# j; at least two of the K computation centres CPF#i being located respectively on geographically mutually remote sites linked by a first communications network, the at least one reception and observation ground station, the N broadcasting ground stations NLES#j being connected to the K computation centres CPF#i respectively by a second communications network and a third communications network. The space based augmentation system SBAS is characterized in that the K computation centres (CPF#i) are each configured to formulate a string of N i-th parallel streams of messages NOF i.j, j varying from 1 to N, such that the string of all the streams of messages NOF i.j, independently of the computation centre CPF#i which formulate them, comprises one and the same temporal sequence (MTs) of types MTs of messages and which is independent of the space based or aeronautical broadcasting means (GEO#j), the types MTs of messages of the sequence (MTs) lying in a predetermined set {Tm} of types Tm of navigation message contents.

According to particular embodiments, the space based or aeronautical augmentation system comprises one or more of the following characteristics:

at each current computation cycle of the messages, a single computation centre CPF#m, taken from among the K computation centres CPF#i, is selected and authorized to transmit to the broadcasting ground stations NLES#j the current messages NOF m.j, m denoting the index of the computation centre CPF#m selected at the current computation cycle and the selected computation centre CPF#m being considered to be the master computation centre of the augmentation system during the said current computation cycle;

the contents of the N data streams NOF i.j of one and the same computation centre CPF#i differ only by the content of messages whose type or types of contents relate to the predicted or recently measured trajectories of the N space based or aeronautical broadcasting means;

the types Tm of message are standardized and defined according to formats of contents to which the said types respectively pertain, and the contents of two data streams NOF i.j1, NOF i.j2, formulated in parallel by any one and the same computation centre CPF i and intended for two different space based or aeronautical broadcasting means (j1≠j2), differ only by the content of the messages of a first type relating to ephemerides data of one or more space based or aeronautical broadcasting means, and/or by the content of the messages of a second type relating to navigation data of a space based or aeronautical broadcasting means that are more precise than the ephemerides data provided by the messages of the first type;

the messages are defined by an international standards document: RTCA MOPS DO-229-D, entitled "Minimum Operational Performance Standards for Global Positioning System/Wide Area Augmentation Equipment", and the first and second types of messages are respectively denoted "MT17" and "MT9";

all the data streams generated by one and the same computation centre share one and the same algorithm implemented for the processing of the GNSS and SBAS data received by the at least one observation station and for the formulation of all the streams of the data entailing one and the same scheduling of the types of messages and the same contents of a majority of the messages from which majority are excluded messages of a first type relating to ephemerides data of one or more space based or aeronautical broadcasting means, and/or messages of a second type relating to navigation data of a space based or aeronautical broadcasting means that are more precise than the ephemerides data provided by the messages of the first type;

the space based or aeronautical broadcasting means lie in the set composed of GEO geostationary satellites, HEO satellites, MEO satellites, LEO satellites, drones, balloons and aircraft;

the second number K of computation centres is equal to 2; and for i varying from 1 to 2, each i-th computation centre CPF# i comprises: an i-th radioelectric receiver, located on the i-th site associated with the i-th computation centre; and an i-th unit for authorizing the i-th computation centre to transmit the N data streams NOF i.j according to the index j to the N broadcasting ground stations NLES#j. Each i-th authorization unit from among the two authorization units is configured to: at each computation cycle, determine a mode of activity of the i-th computation centre in the SBAS system from among a master mode and a backup mode, the master mode authorizing the single computation centre CPF#m placed in this mode from among the two computation centres to transmit the data streams NOF m.j generated to the N broadcasting ground stations NLES#j, j varying from 1 to N, the backup mode prohibiting the computation centre placed in this mode from transmitting its data streams to the broadcasting ground stations but authorizing the said computation centre to toggle to master mode when a persistent fault in the computation centre currently in master mode has been detected, the mode of activity of the i-th computation centre being determined as a function:

of the knowledge of the computation centre currently in master mode and in the process of transmitting towards the broadcasting stations;

of the regular knowledge of the operating states in terms of absence or existence of faults with the computation centres of the remote sites and of their mode of activity; and of the quality of reception of the messages transmitted to the broadcasting stations; and of the quality of the messages actually transmitted by the space based or aeronautical broadcasting means and received by the radioelectric receiver corresponding to the authorization unit; and as a function of the mode of activity determined, either remain in the previous mode of activity if the mode of activity determined is identical to it, or toggle into the mode of activity determined if it is different from the previous mode of activity;

as a function of the mode of activity determined, authorize the i-th computation centre to transmit or prohibit it from transmitting its data streams towards the N broadcasting ground stations;

the number K of computation centres is greater than or equal to 3; and for i varying from 1 to K, each i-th computation centre CPF#i comprises: an i-th radioelectric receiver, located on the i-th site associated with the i-th computation centre, and an i-th unit for authorizing the i-th computation centre to transmit the N data streams NOF i.j according to the index j to the N broadcasting ground stations NLES#j. Each i-th authorization unit from among the K authorization units is configured to: at each computation cycle, determine a mode of activity of the i-th computation centre in the SBAS system from among a single master mode, a first-backup mode, and a reserve backup mode, the master mode authorizing the single computation centre CPF#m placed in this mode from among the K computation centres to transmit the data streams NOF m.j generated to the N broadcasting ground stations NLES#j, j varying from 1 to N, the first-backup mode prohibiting the computation centre placed in this mode from transmitting its data streams to the broadcasting ground stations but authorizing the said computation centre to toggle to master mode when a persistent fault in the computation centre currently in master mode has been detected, the reserve backup mode prohibiting the computation centre placed in this mode from transmitting its data streams to the broadcasting ground stations but authorizing the said computation centre to toggle to first-backup mode when an absence of computation centre placed in first-backup mode has been detected; the mode of activity of the i-th computation centre being determined as a function of the knowledge of the computation centre currently in master mode and in the process of transmitting towards the broadcasting stations; * of the regular knowledge of the operating states in terms of absence or existence of faults with the computation centres of the remote sites and of their mode of activity; and of the quality of reception of the messages transmitted to the broadcasting stations; and of the quality of the messages actually transmitted by the space based or aeronautical broadcasting means and received by the radioelectric receiver corresponding to the authorization unit; and as a function of the mode of activity determined, either remain in the previous mode of activity if the mode of activity determined is identical to it, or toggle into the mode of activity determined if it is different from the previous mode of activity;

as a function of the mode of activity determined, authorize the i-th computation centre to transmit or prohibit it from transmitting its data streams towards the N broadcasting ground stations;

each i-th authorization unit is configured to: monitor the good reception of return messages dispatched by the broadcasting ground stations acknowledging receipt of the messages transmitted by the authorization unit through the third communications network; and monitor the operating states of the computation centres of the remote sites and their mode of activity through the first communications network; and monitor the messages actually broadcast by the space based or aeronautical broadcasting means so as to confirm or otherwise an absence of repetitivity of a link fault;

for i varying from 1 to K, each i-th computation centre furthermore comprises at least one i-th unit for processing and for creating streams of navigation messages NOF i.j and at least one i-th unit for checking the integrity of the streams of navigation messages NOF i.j, varying from 1 to N; the i-th computation centre being authorized to transmit the streams of messages when the integrity checks have been successful.

The subject of the invention is also a method for managing navigation data streams of a space based or aeronautical augmentation system adapted for improving the precision and the reliability of the data delivered by a satellite navigation system. The space based or aeronautical augmentation system comprises:

a space based or aeronautical segment having a first integer number N, greater than or equal to two, of space based or aeronautical broadcasting means GEO#j, furnished respectively with their transmit/receive means adapted for transmitting data received from associated broadcasting ground stations NLES#j, destined for one and the same predetermined geographical zone;

a ground infrastructure segment comprising:

N transmission ground stations NLES#j, associated respectively with the N space based or aeronautical broadcasting means GEO#j so as to transmit navigation data to them and numbered respectively by a first integer index j varying from 1 to N, and at least one observation and reception ground station for signals transmitted by at least one satellite of the global satellite navigation system and by the N space based or aeronautical broadcasting means GEO#j, a second number K, greater than or equal to 2, of computation centres CPF#i under redundancy, numbered respectively by a second index i varying from 1 to K, and configured to compute, on the basis of the signals transmitted by the reception ground station or stations, streams or sequences of navigation messages NOF i.j, i varying from 1 to K and j varying from 1 to N, that are ready to be transmitted respectively according to the index j to the N broadcasting ground stations NLES#j; at least two of the K computation centres (CPF#i) being located respectively on geographically mutually remote sites linked by a first communications network, and the at least one reception and observation ground station, the N broadcasting ground stations NLES#j respectively, being connected to the K computation centres CPF#i by a second communications network and a third communications network. The method for managing streams of navigation messages is characterized in that it comprises:

a first step in which the K computation centres CPF#i, i varying from 1 to K, each separately formulate a string of N parallel streams of navigation messages NOF i.j, j varying from 1 to N, the string of all the data streams NOF i.j, independently of the computation centre CPF#i which formulate them, comprises one and the same sequence (MTs) of types MTs of messages, which is independent of the space based or aeronautical broadcasting means, the types MTs of messages of the sequence lying in a predetermined set {Tm} of types Tm of navigation message contents.

According to particular embodiments, the method for managing navigation data streams comprises one or more of the following characteristics:

the types {Tm} of message are standardized and defined according to formats of contents to which the said types respectively pertain; and the contents of two data streams NOF i.j1, NOF i.j2, formulated in parallel by any one and the same computation centre CPF i and intended for two different space based or aeronautical broadcasting means (j1≠j2), differ only by the content of the messages of a first type relating to ephemerides data of one or more space based or aeronautical broadcasting means, and/or by the content of the messages of a second type relating to navigation data of a space based or aeronautical broadcasting means that are more precise than the ephemerides data provided by the messages of the first type;

for i varying from 1 to K, each i-th computation centre CPF i comprises: an i-th radioelectric receiver, located on the i-th site associated with the i-th computation centre, and an i-th unit for authorizing the i-th computation centre to transmit the N data streams NOF i.j according to the index j to the N broadcasting ground stations NLES#j.

The method furthermore comprises:

a second step in which each i-th authorization unit determines in the current computation phase a current mode of activity in the augmentation system from among a single master mode and a backup mode, the master mode authorizing the single computation centre CPFm placed in this mode from among the K computation centres to transmit the data streams NOF m.j generated to the N broadcasting ground stations NLES j, the backup mode prohibiting the computation centre placed in this mode from transmitting its data streams to the broadcasting ground stations but authorizing the said computation centre to toggle to master mode in a manner coordinated with other computation centres if appropriate when a persistent fault in the computation centre currently in master mode has been detected; the mode of activity of the i-th computation centre being determined as a function:

of the knowledge of the computation centre currently in master mode and in the process of transmitting towards the broadcasting stations;

of the regular knowledge of the operating states in terms of absence or existence of faults with the computation centres of the remote sites and of their mode of activity; and of the quality of reception of the messages transmitted to the broadcasting stations; and of the quality of the messages actually transmitted by the space based or aeronautical broadcasting means and received by the radioelectric receiver corresponding to the authorization unit; and a third step in which, for i varying from 1 to K, as a function of the mode of activity determined, the i-th authorization unit remains in the previous mode of activity if the mode of activity determined is identical to it, or toggles into the mode of activity determined if it is different from the previous mode of activity; and a fourth step, in which for i varying from 1 to K, as a function of the mode of activity determined, the i-th authorization unit authorizes the i-th computation centre to transmit or prohibits it from transmitting its data streams towards the N broadcasting ground stations;

the second step of determining the mode of activity comprises fifth, sixth, seventh steps, each i-th authorization unit monitoring in the fifth step the good reception of return messages dispatched by the broadcasting ground stations NLES#j acknowledging receipt of the messages transmitted by the i-th authorization unit through the third communications network; and each i-th authorization unit monitoring if necessary in the sixth step the operating states of the computation centres of the remote sites and their mode of activity through maintenance messages originating from the remote authorization units; and each i-th authorization unit monitoring if necessary in the seventh step the messages actually broadcast by the space based or aeronautical broadcasting means so as to confirm or otherwise an absence of repetitivity of a fault.

BRIEF DESCRIPTION OF THE DRAWINGS

The invention will be better understood on reading the following description of several embodiments, which is given solely by way of example and while referring to the drawings in which.

DETAILED DESCRIPTION

Figure 2:
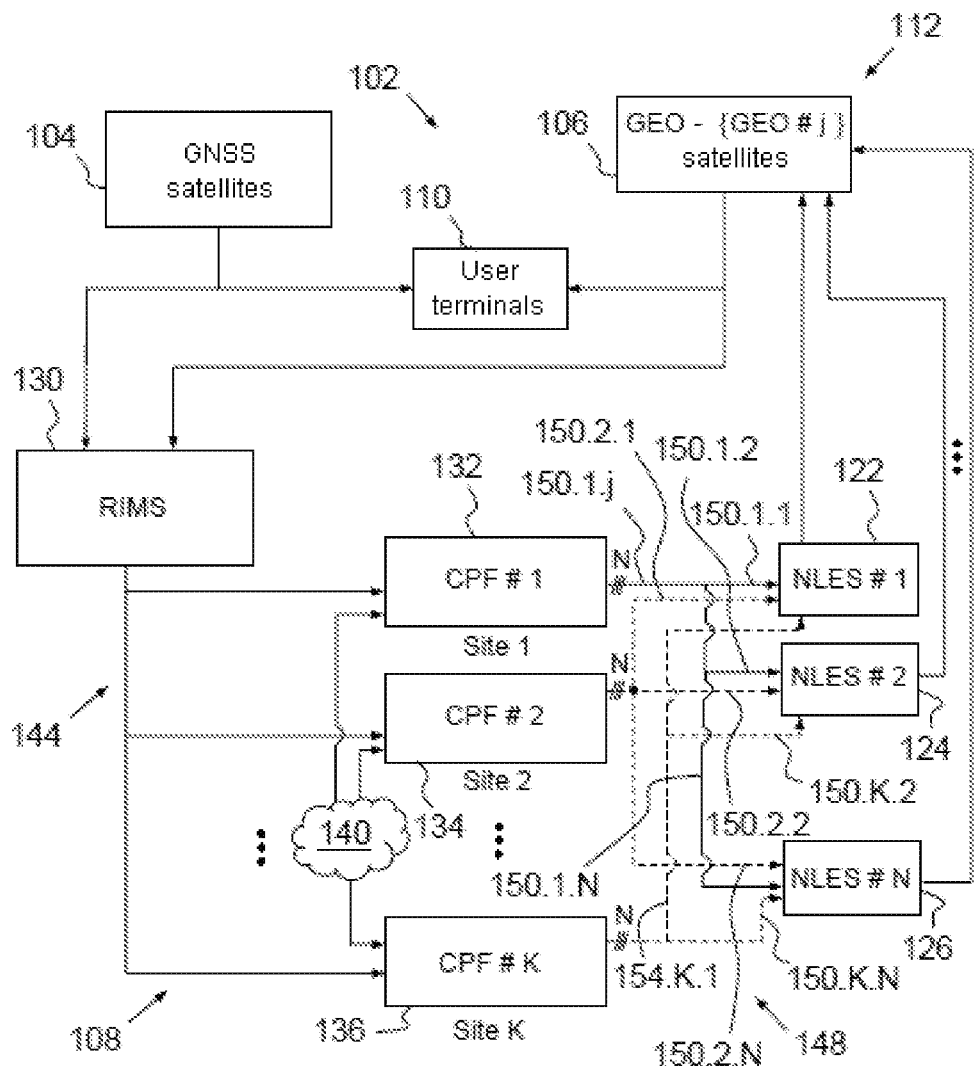
FIG. 2 is a view of a general hardware architecture of a single-channel SBAS system according to the invention, in which the navigation messages broadcast by the SBAS broadcasting satellites are substantially identical and the complexity of the computation centres is decreased.

According to FIG. 2, a space based augmentation system SBAS 102, adapted for improving the precision and the reliability of the data delivered by a GNSS global satellite navigation system 104, comprises a space based or aeronautical segment 106, a ground infrastructure segment 108 and a users segment 110.

The space based or aeronautical segment 106 comprises a first integer number N, greater than or equal to two, of space based or aeronautical broadcasting means 112, here in a particular manner a set of N geostationary satellites, denoted subsequently GEO#j, j being a first integer numbering index varying from 1 to N. The N geostationary satellites GEO#j, j varying from 1 to N, are furnished respectively with their transmit/receive means adapted for transmitting data received from different associated broadcasting ground stations NLES#j, destined for one and the same predetermined geographical zone.

Figure 1:
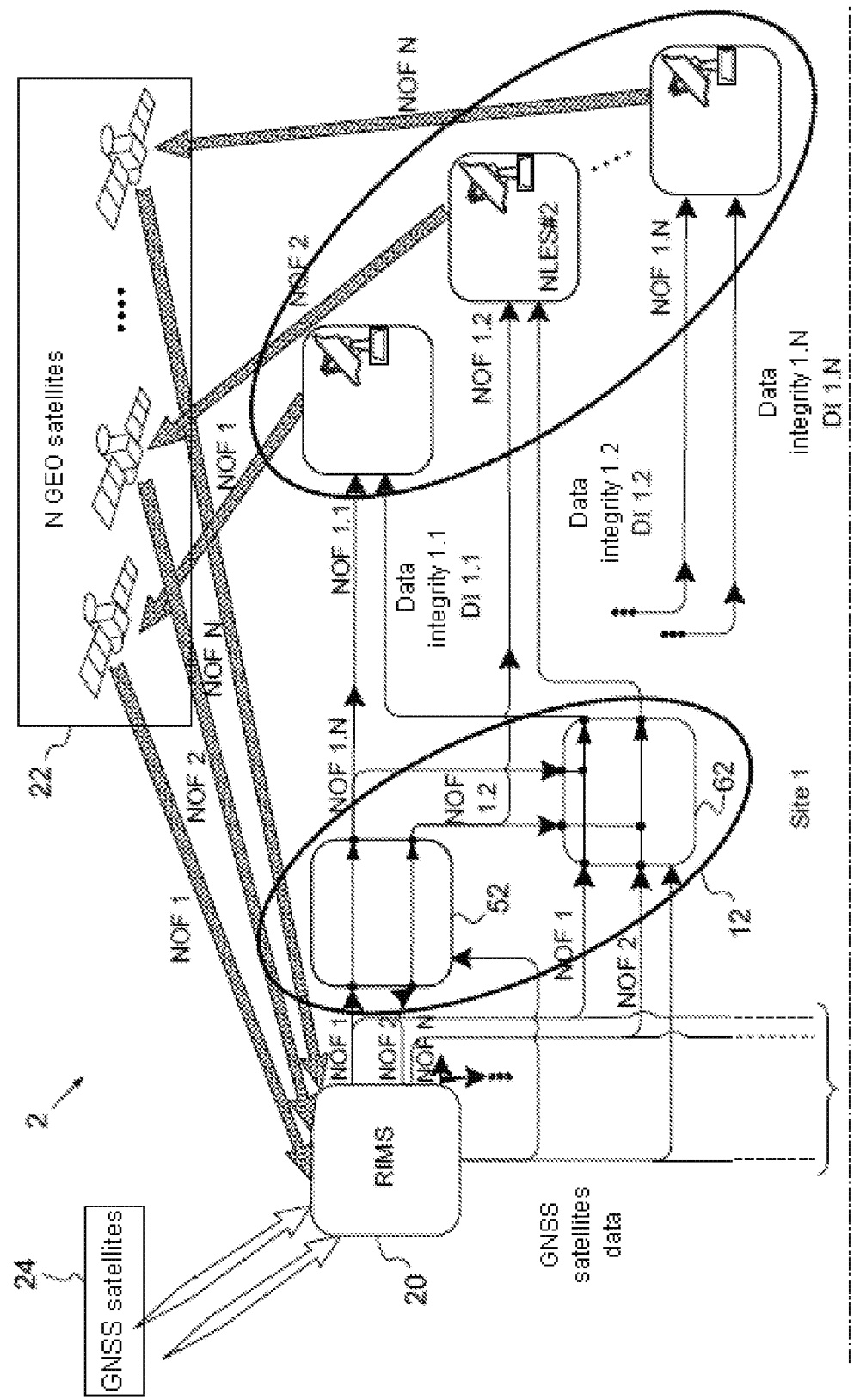
FIG. 1 is a view of a general architecture of a multichannel conventional SBAS system in which the navigation messages broadcast by the SBAS broadcasting satellites are totally independent and require in each computation centre a number of independent processing pathways which is equal to the number of SBAS broadcasting satellites.
Figure 1:
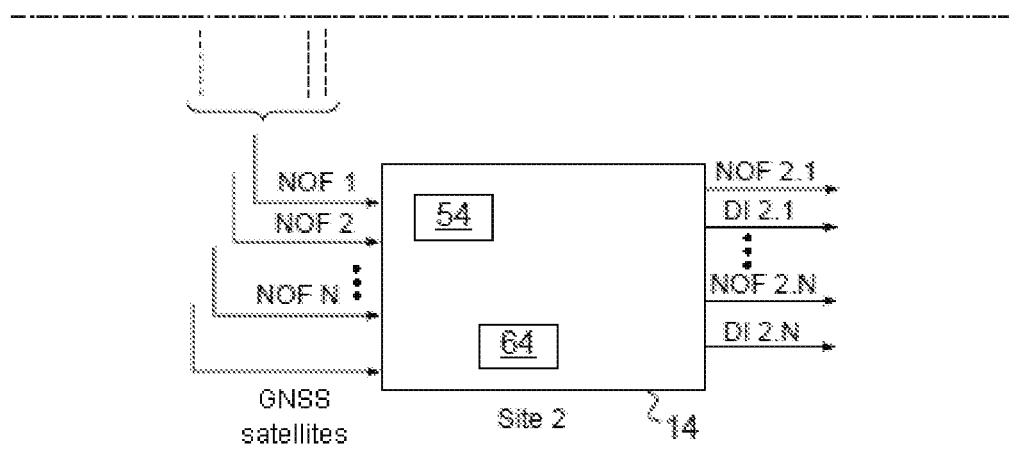

The ground infrastructure segment 108 comprises N broadcasting ground stations denoted NLES#j, j varying from 1 to N, only the stations NLES#1, NLES#2, NLES#N being represented in FIG. 1 and denoted respectively by the numerical references 122, 124, 126. The N broadcasting ground stations NLES#j are associated respectively with the N geostationary satellites GEO#j so as to transmit navigation data to them. In a particular manner, the broadcasting ground stations 122, 124, 126 are thus associated with the geostationary satellites GEO#1, GEO#2, and GEO#N.

It should be noted that for security and availability reasons each broadcasting ground station NLES#j can be made redundant by at least one other backup ground station, ready to execute the same functions as those of the nominal broadcasting ground station NLES#j with which it is associated in case of failure of the said nominal broadcasting ground station NLES#j. The ground infrastructure segment 108 also comprises a set 130 of one or more RIMS observation and reception ground stations for signals transmitted by at least one satellite of the GNSS global satellite navigation system 104 and by the N geostationary satellites GEO#j, j varying from 1 to N.

The ground infrastructure segment 108 also comprises a second integer number K, greater than or equal to 2, of computation centres CPF#i made mutually redundant, numbered respectively by a second index i varying from 1 to K, and configured to compute, on the basis of the signals transmitted by the RIMS reception ground station or stations 130, strings of streams of navigation messages NOF i,j, i varying from 1 to K and j varying from 1 to N, that are ready to be transmitted respectively according to the index j to the N broadcasting ground stations NLES#j. Here in FIG. 2 and by way of example, K is greater than or equal to 3, and only the three computation centres CPF#1, CPF#2, CPF#K are represented and denoted respectively by the numerical references 132, 134, 136.

The K computation centres CPF#i, i varying from 1 to K, are located respectively on geographically mutually remote sites "Site i" linked by a first communications network 140 so as to exchange maintenance messages relating to their respective operating state.

The RIMS reception and observation ground station or stations 130 are connected to the K computation centres CPF#i, 132, 134, 136 by a second communications network 144 so as to provide them at each computation cycle with the navigation data of the GNSS satellites and the streams of navigation messages retransmitted by the geostationary satellites GEO#j.

The N broadcasting ground stations NLES#j, 122, 124, 126 are each connected to the K computation centres CPF#i, 132, 134, 136 by a third communications network 148 so as to receive the streams of SBAS navigation messages formulated by the computation centre which is in an activity master mode, here the computation centre CPF#1 or 132.

By convention in FIG. 2, the links 150.1.j, j varying from 1 to N of the third communications network 148 which are active and allow transit of the SBAS navigation messages formulated by the master computation centre, here CPF#1 132, towards the broadcasting ground stations NLES#j, j varying from 1 to N, are drawn as solid lines. The links 150.i.j, i varying from 2 to K and j varying from 1 to N, of the third communications network 148 which are inactive and connect the remaining computation centres here in backup mode, that is to say the computation centres CPF#i, i varying from 2 to N, to the broadcasting ground stations NLES#j, j varying from 1 to N are drawn as dashed lines.

According to the invention, the space based augmentation system SBAS 102 is characterized by the fact that the K computation centres CPF#i, i varying from 1 to K, are each configured to formulate a string of i-th parallel streams of messages NOF i.j, j varying from 1 to j, such that any string of the N parallel streams of messages NOF i.j, independently of the computation centre CPF#i which formulate them, comprises one and the same temporal sequence of types of messages which is independent of the space based broadcasting means namely here the geostationary satellites GEO#j. The types MTs of messages of the sequence (MTs) lie in a predetermined set {Tm} of types of contents of navigation messages, m being an integer varying from 1 to the cardinal of the said predetermined set {Tm}.

At each current computation cycle of the streams of messages NOF i.j, a single computation centre CPF#m, taken from among the K computation centres CPF#i, i varying from 1 to K, is selected and authorized by the SBAS system 102 to transmit to the broadcasting ground stations NLES#j, j varying from 1 to N, the current messages associated with the streams of messages NOF m.j, m denoting the index of the computation centre CPF#m selected at the current computation cycle and the computation centre CPF#m being considered to be the master computation centre of the SBAS system 102 during this current computation cycle.

The contents of the N streams of messages NOF i.j of one and the same computation centre CPF#i differ only by the content of messages whose type or types of contents relate to the predicted or recently measured trajectories of the N geostationary satellites GEO#j, j varying from 1 to N.

The types of message Tm of the set {Tm} are standardized and defined according to formats of contents to which the said types Tm respectively pertain. The contents of two streams of messages NOF i.j1, NOF i.j2, formulated in parallel by any one and the same computation centre CPF#i and intended for two geostationary satellites GEO#j1, GEO#j2 with j1 and j2 different, when the streams are different differ only by the content of the messages of a first type relating to ephemerides data of one or more geostationary satellites, and/or by the content of the messages of a second type relating to navigation data of a geostationary satellite that are more precise than the ephemerides data provided by the messages of the first type.

The types of messages Tm are defined by an international standards document: RTCA MOPS DO-229-D, entitled "Minimum Operational Performance Standards for Global Positioning System/Wide Area Augmentation Equipment", and the first and second types of messages are respectively denoted "MT17" and "MT9" according to this standard.

Thus, all the streams of navigation messages generated by one and the same computation centre CPF share one and the same algorithm, implemented for the processing of the GNSS and SBAS data received by the RIMS observation station or stations 130 and for the formulation of all the streams of SBAS messages. The streams of messages generated by the algorithm are characterized by one and the same scheduling of the types of messages and of the same contents of a majority of the messages, with the exception of messages of a first type relating to ephemerides data of one or more geostationary satellites, and/or messages of a second type relating to navigation data of a geostationary satellite that are more precise than the ephemerides data provided by the messages of the first type.

Figure 3:
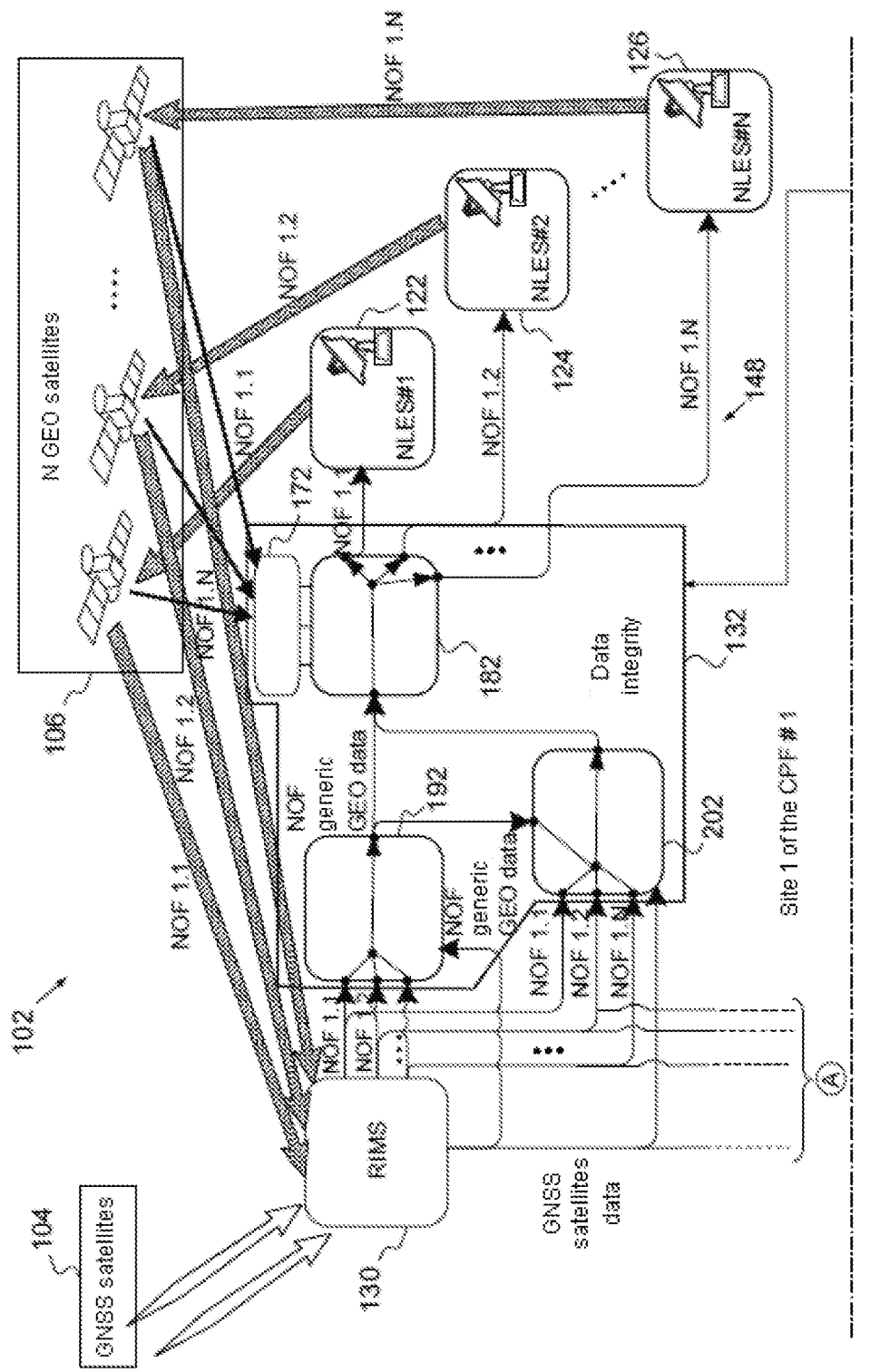
FIG. 3 is a view of a detailed hardware architecture of the single-channel SBAS system according to the invention of FIG. 2.
Figure 3:
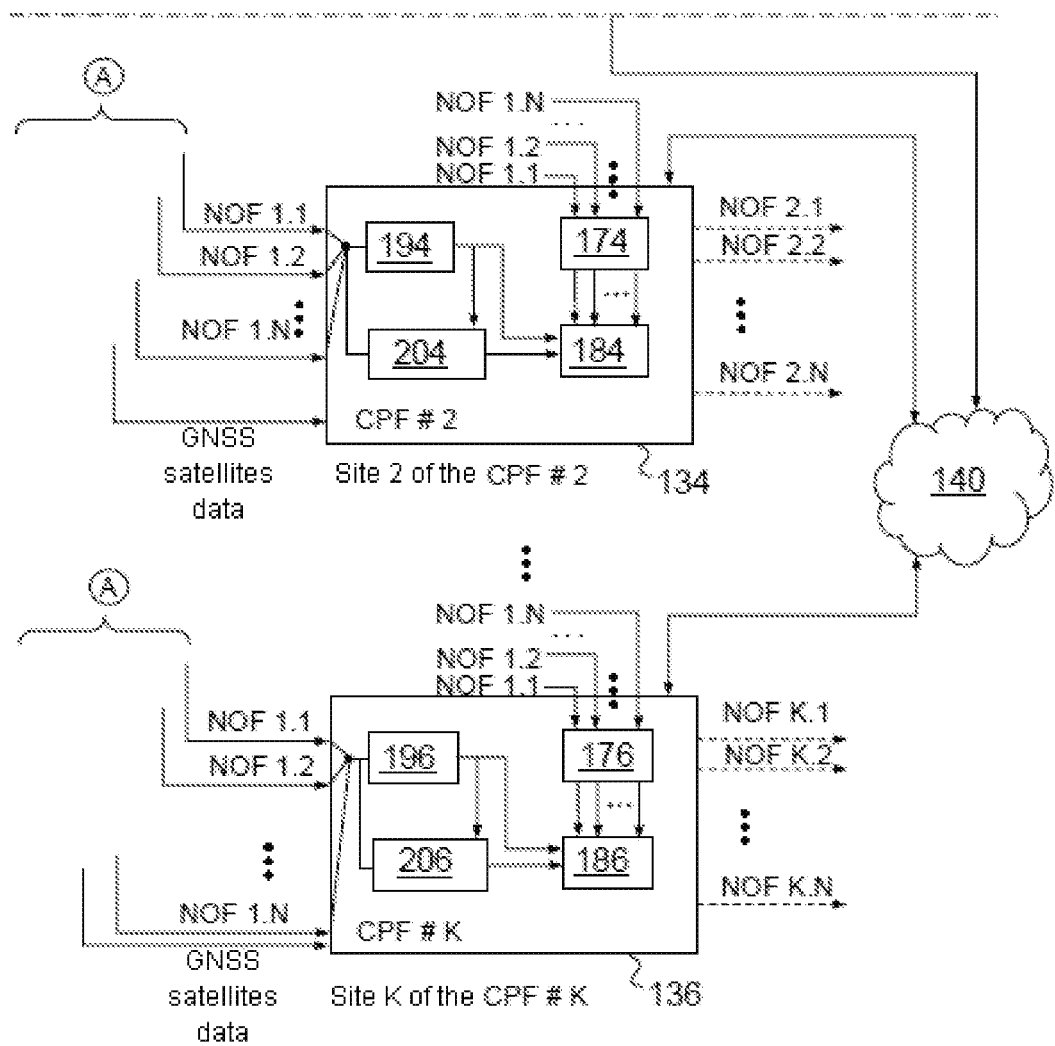
Figure 4:
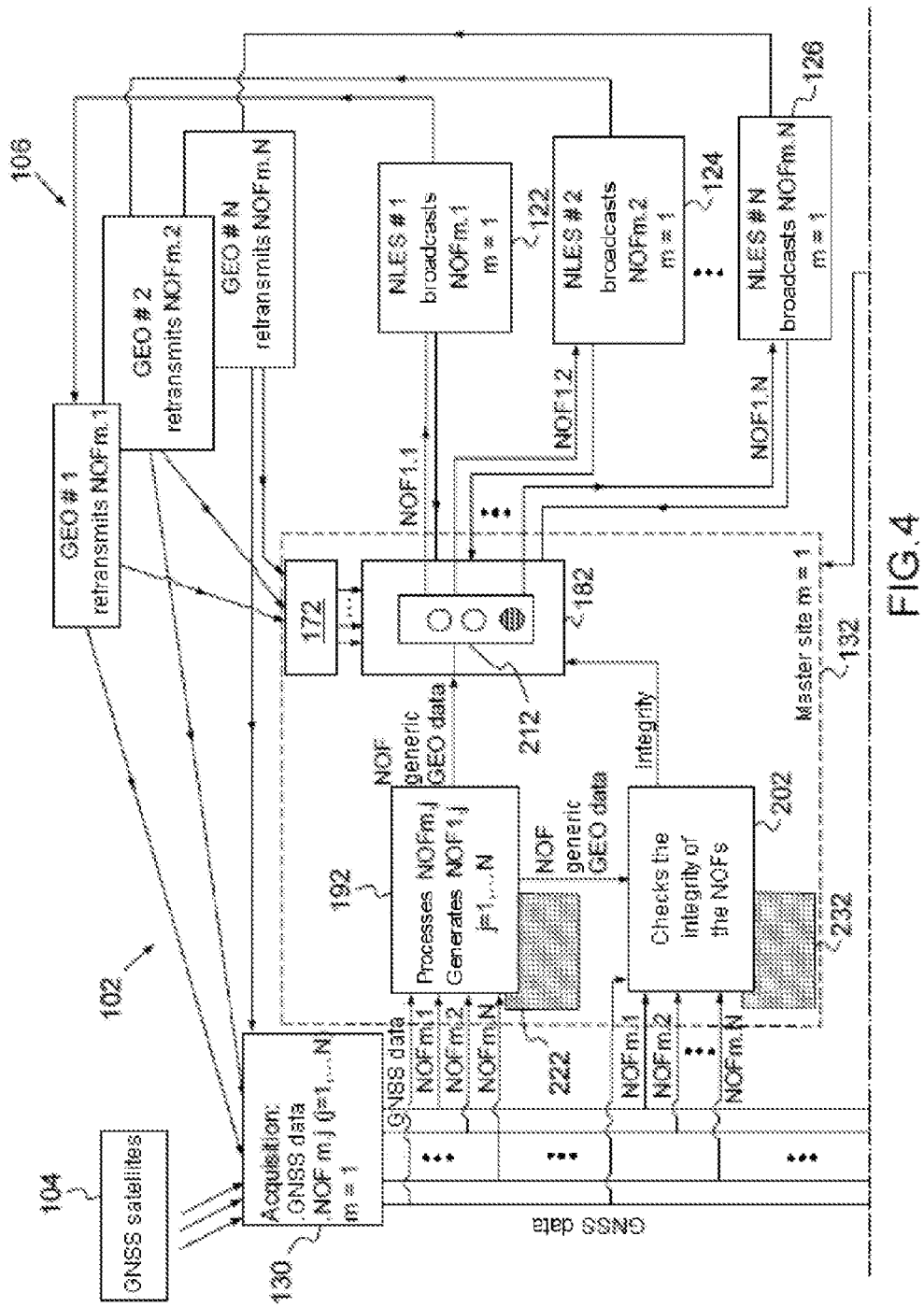
FIG. 4 is a view of a functional and hardware architecture, still more detailed than that of FIG. 3, of the single-channel SBAS system according to the invention.
Figure 4:
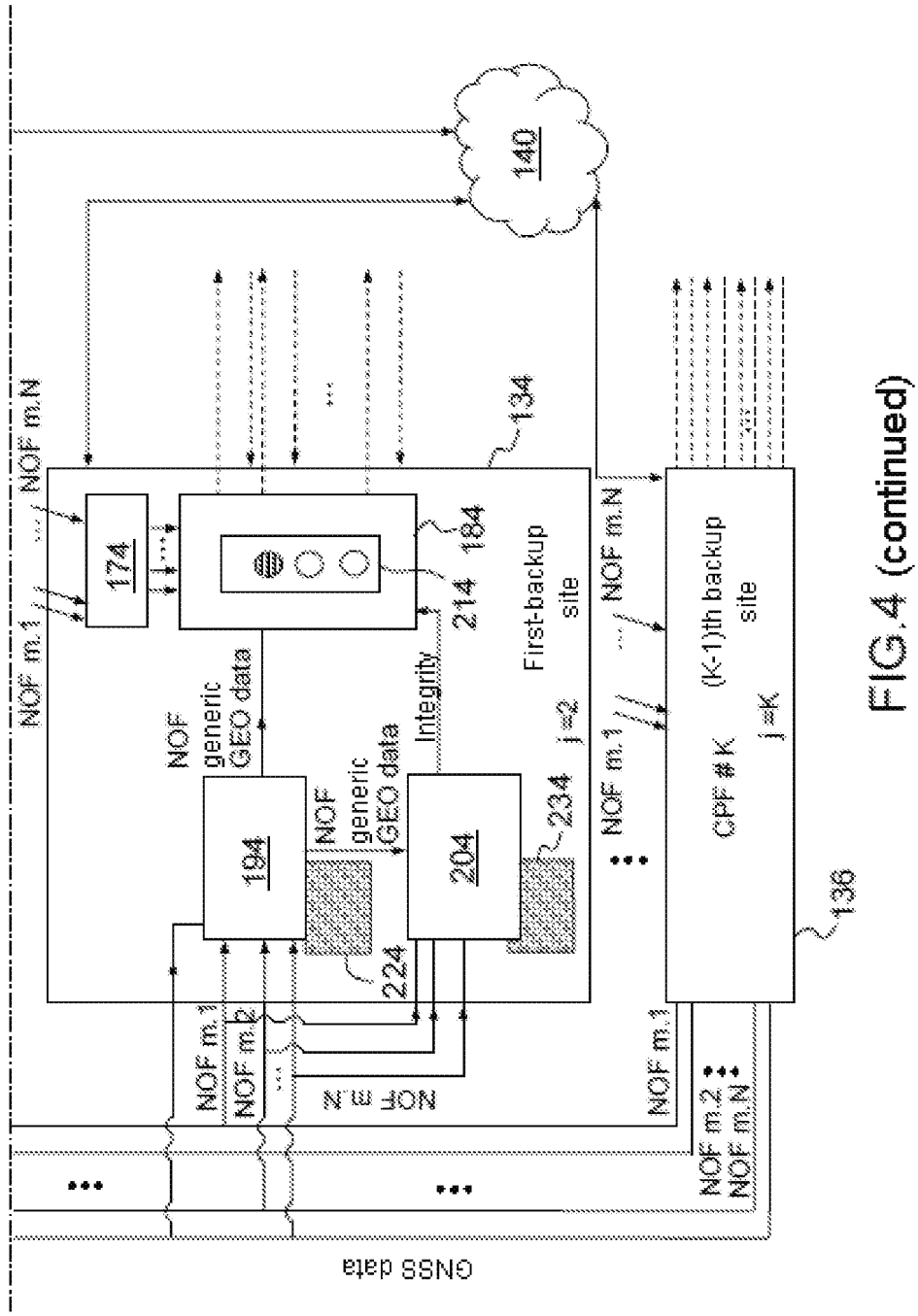

According to FIGS. 3 and 4, the single-channel SBAS system 102 of FIG. 2 according to the invention is described in more detail. When elements from FIG. 2 are repeated in FIGS. 3 and 4, they are denoted respectively by identical numerical references.

For i varying from 1 to K, each i-th computation centre CPF#i, 132, 134, 136, comprises an i-th radioelectric receiver, located on the i-th site associated with the i-th computation centre CPF#i, and an i-th unit for authorizing the i-th computation centre CPF#i to transmit according to the index j the N streams of messages NOF i.j to the N broadcasting ground stations NLES#j.

Here in FIGS. 3 and 4, only the first, second, K-th radioelectric receivers respectively denoted 172, 174, 176, and only the first, second, K-th authorization units, respectively denoted 182, 184, 186, are represented.

For i varying from 1 to K, each i-th computation centre CPF#i, 132, 134, 136 also comprises one or more i-th units for processing and for creating streams of navigation messages NOF i.j and one or more i-th units for checking the integrity of the streams of navigation messages created NOF i.j.

When for redundancy reasons an i-th computation centre CPF#i comprises several i-th units for processing and for creating streams of navigation messages NOF i.j and/or several units for checking the integrity of the streams of navigation messages created NOF i.j, then the corresponding i-th authorization unit is configured to select from among the i-th redundant units for processing and for creating streams of navigation messages NOF i.j, and/or respectively from among the units for checking the integrity of the streams of navigation messages created NOF i.j, which processing unit and/or respectively which integrity check are active. Here in FIGS. 3 and 4, only the first, second, K-th units, denoted 192, 194, 196, for processing and for creating streams of navigation messages, and only the first, second, K-th units, respectively denoted 202, 204, 206, for checking the integrity of the streams of navigation messages created, are represented.

Each i-th authorization unit 182, 184, 186 from among the K authorization units is configured to determine at each computation cycle a mode of activity of the i-th computation centre CPF#i within the SBAS system 102 from among a single master mode, a single first-backup mode, and a reserve backup mode.

The master mode authorizes a single computation centre CPF#m, placed in this mode from among the K computation centres, to transmit its generated data streams NOF m.j to the N broadcasting ground stations NLES#j, j varying from 1 to N.

The first-backup mode prohibits a single computation centre placed in this mode from transmitting its data streams to the broadcasting ground stations NLES#j, j varying from 1 to N, but authorizes the said computation centre to toggle to master mode when a persistent fault has been detected on the computation centre CPF#m previously in master mode in one or more previous computation phase(s).

The reserve backup mode which can be used when K is greater than or equal to 3 prohibits the computation centre placed in this mode from transmitting its data streams to the broadcasting ground stations NLES#j, j varying from 1 to N, but authorizes the said computation centre to toggle to first-backup mode when an absence of computation centre placed in first-backup mode has been detected.

The mode of activity of the i-th computation centre is determined as a function of the knowledge of the computation centre currently in master mode and in the process of transmitting towards the broadcasting stations, of the regular knowledge of the operating states in terms of absence or existence of faults with the computation centres of the remote sites and of their mode of activity, of the quality of reception of the messages transmitted to the broadcasting stations when the authorization unit is in master mode, and of the quality of the messages actually transmitted by the geostationary satellites and received by the radioelectric receiver corresponding to the authorization unit.

Each i-th authorization unit 182, 184, 186 from among the K authorization units is also configured at each computation cycle and as a function of the mode of activity determined, either to remain in the previous mode of activity if the current mode of activity determined and the previous mode of activity are identical, or to toggle into the mode of activity determined if it is different from the previous mode of activity.

Each i-th authorization unit 182, 184, 186 from among the K authorization units is also configured, at each computation cycle and as a function of the mode of activity determined, to authorize the i-th computation centre CPF#i to transmit or to prohibit it from transmitting its data streams towards the K broadcasting ground stations.

Each i-th authorization unit from among the K authorization units is also configured to:

monitor the good reception of return messages dispatched by the broadcasting ground stations NLES#j acknowledging receipt of the messages transmitted by the authorization unit through the third communications network 148; and monitor the operating states of the computation centres of the remote sites and their mode of activity which are provided by maintenance messages ("keep alive") originating from the remote authorization units through the first communications network 140; and monitor the SBAS navigation messages actually broadcast by the geostationary satellites and received by the associated i-th radioelectric receiver so as to confirm or otherwise an absence of repetitivity of a fault with the computation centre CPF#i and/or with its links with the other remote entities of the system 102.

It should be noted that when the m-th authorization unit determines the m-th computation centre CPF#m in master mode in the current computation phase, the computation centre CPF#m is authorized to transmit the streams of messages NOF m.j towards the K broadcasting stations only when in addition the integrity checks of the messages NOF m.j, executed by the associated m-th integrity checking unit have been successful.

According to FIGS. 3 and 4, the computation centre for which the mode of activity determined is the master mode is assumed here to be the first computation centre CPF#1 and consequently the index m is equal to 1 in these FIGS. 3 and 4. The remaining computation centres CPF#i, i varying from 2 to N are therefore assumed to be in backup mode and prohibit one another from transmitting streams of messages NOF i.j (i varying from 2 to N) towards the K broadcasting ground stations. In the manner of FIG. 2, the links connecting the first authorization unit 182 in master mode to the K broadcasting ground stations are drawn as solid lines to signify that they allow the streams of messages NOF 1.j to pass through, while the links connecting the i-th units 184, 186 placed in backup mode to the K broadcasting ground stations are drawn as dashed lines to signify that they are not authorized to allow the streams of messages NOF i.j to pass through, i varying from 2 to K and j varying from 1 to N.

According to FIG. 4, the mode of activity determined in the current computation phase by the first authorization unit 182, here the master mode, is represented by a first three-colour traffic light whose spot lit "green" is the lower end spot to signify authorization to transmit streams of messages NOF 1.j to the N broadcasting ground stations. The mode determined in the current computation phase by the second authorization unit 184, here assumed to be the first-backup mode, is represented by a second three-colour traffic light whose spot lit "red" is the upper end spot to signify prohibition to transmit streams of messages NOF 2.j to the N broadcasting ground stations. In regard to the remaining authorization units for i greater than or equal to three, the modes of activity determined are reserve backup modes, not represented by three-colour traffic lights for the sake of readability of FIG. 4.

It should be noted that in FIG. 4, for each computation centre the associated unit for processing and for formulating the message streams, as well as the associated unit for checking the integrity data are duplicated just once by additional equipment so as to increase the reliability and the availability of the computation centre, only the additional equipment 222, 224, 232, 234 of the first and second computation centres 132, 134 being illustrated.

In a variant of the single-channel SBAS system of FIGS. 2 to 4, the single-channel SBAS system according to the invention comprises in its minimum configuration just two computation centres and each computation centre consists of a single unit for processing and for formulating navigation messages, a single unit for checking the integrity of the navigation messages generated, a single radioelectric receiver and a single authorization unit for authorizing transmission of the messages generated.

In order to increase the reliability of the system, it is possible in multiple other variants for one or more items of equipment of the computation centre to be made redundant within one and the same site, the duplication configuration of the units for processing and for checking integrity such as is proposed in FIG. 4 being a particular typical redundancy configuration from among all the possible redundancies.

It is also possible to envisage and to have several computation centres CPFs co-located on one and the same site so as to circumvent intersite network problems.

Figure 5:
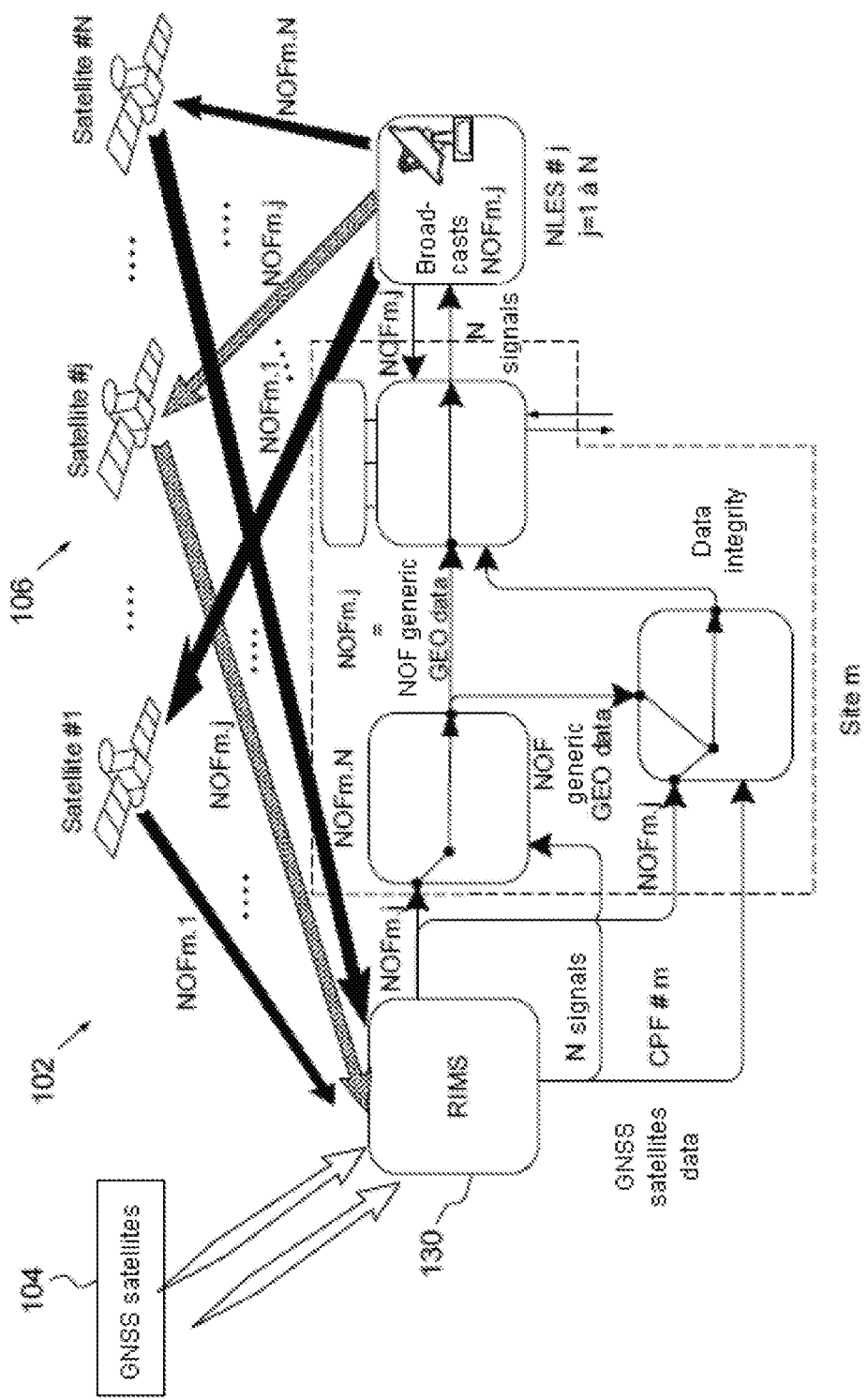
FIG. 5 is a partial view of the detailed architectures of FIGS. 3 and 4 bringing to light the configuration of a computation centre CPF, determined in master activity mode by its authorization unit.

According to FIG. 5, the architecture of the single-channel SBAS system 102 is represented from the point of view of the computation centre in master mode whose integer index m can vary between 1 and K during the course of the computation phases.

The m-th processing and formulation unit formulates here in the current computation phase N streams of messages NOF m.j, j varying from 1 to N and delivers them ready to be transmitted to the m-th authorization unit.

The m-th authorization unit determines its mode of activity as a function of the return messages from the broadcasting ground stations NLES#j, of the navigation messages NOF m.j actually retransmitted by the geostationary satellites 106, and the maintenance messages of the remote sites.

If the mode determined is the master mode, the m-th authorization unit authorizes the transmission of the streams of messages NOF m.j to the N ground stations NLES#j.

The N broadcasting ground stations immediately transmit the N streams of messages received NOF m.j to their respective satellites which broadcast them according to one and the same geographical coverage to the user terminals, not represented in FIG. 5, to the RIMS reception and observation stations 130, and to the radioelectric receivers of the computation centres.

Figure 6:
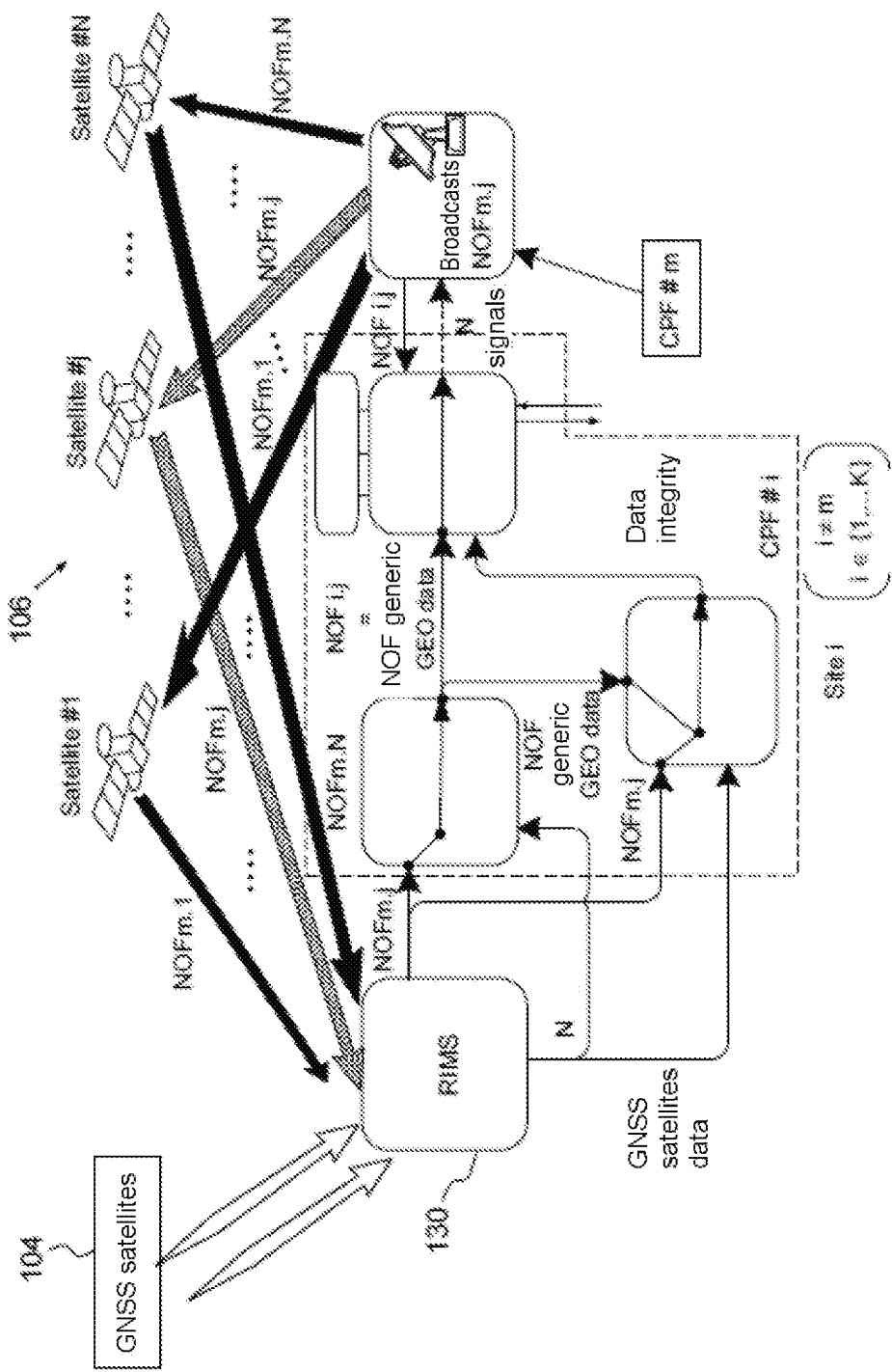
FIG. 6 is a partial view of the detailed architectures of FIGS. 3 and 4 bringing to light the configuration of a computation centre CPF, determined in backup activity mode by its authorization unit.

According to FIG. 6 and in a manner complementary to FIG. 5, the architecture of the single-channel SBAS system 102 is represented from the point of view of a computation centre placed in backup mode whose integer index i lying between 1 and K is different from the index m of the computation centre currently determined in master mode.

Each i-th processing and formulation unit, i varying from 1 to K and different from m, formulates in the current computation phase N streams of messages NOF i.j, j varying from 1 to N and delivers them ready to be transmitted to the i-th authorization unit.

The i-th authorization unit determines its mode of activity as a function of the return messages from the broadcasting ground stations, of the navigation messages NOF m.j actually retransmitted by the geostationary satellites 106, and the maintenance messages of the remote sites.

If its mode determined is a backup mode, the i-th authorization unit prohibits the i-th computation centre CPF#i from transmitting the streams of messages NOF i.j to the N ground stations NLES#j.

The N broadcasting ground stations do not then receive any message from the i-th computation centres determined in backup mode.

Figure 7:
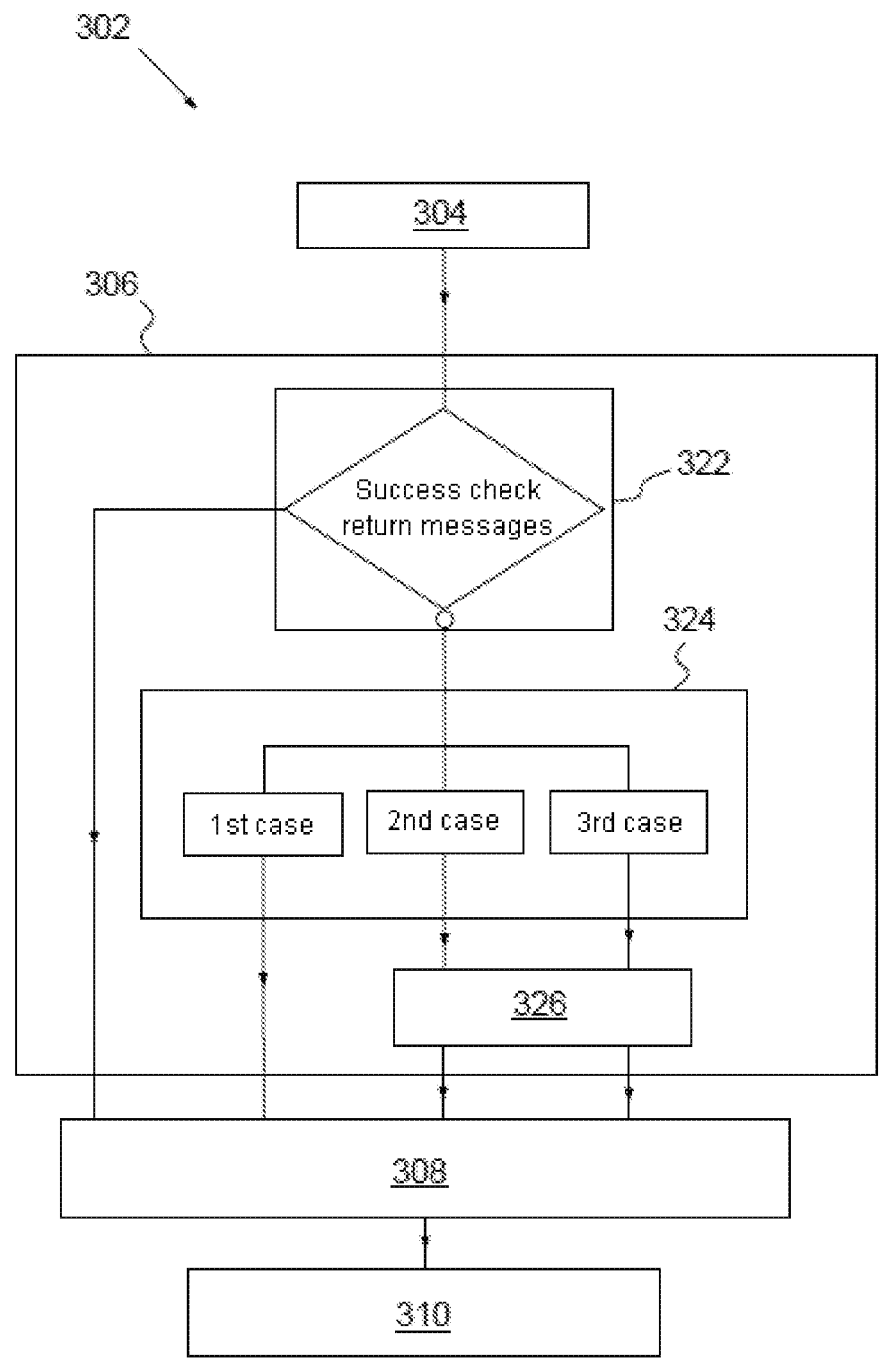
FIG. 7 is a general flowchart of a method for managing navigation data streams, implemented by the SBAS system, described in FIGS. 2 to 6, according to the invention.

According to FIG. 7, a method for managing navigation data streams 302 according to the invention is implemented by the single-channel SBAS space based augmentation system according to the invention, described in FIGS. 2 to 6, and in which the second number K of computation centres is greater than or equal to 3.

The method for managing navigation data streams 302 comprises a first step 304 in which the K computation centres CPFi, i varying from 1 to K, each separately formulate a string of N parallel streams of navigation messages NOF i.j, j varying from 1 to N, that are substantially identical.

The string of the N parallel streams of messages NOF i.j, independently of the computation centre CPFi which formulate them, comprises one and the same sequence (MTs) of types MTs of messages, which is independent of the geostationary satellites GEO#j, j varying from 1 to N, the types MTs of messages of the sequence lying in a predetermined set {Tm} of types Tm of navigation message contents.

The types of message Tm of the set {Tm} are standardized and defined according to formats of contents to which the said types Tm respectively pertain.

The contents of two streams of messages NOF i.j1, NOF i.j2, formulated in parallel by any one and the same computation centre CPF#i and intended for two geostationary satellites GEO#j1, GEO#j2 with j1 and j2 different, when the streams are different differ only by the content of the messages of a first type relating to ephemerides data of one or more geostationary satellites, and/or by the content of the messages of a second type relating to navigation data of a geostationary satellite that are more precise than the ephemerides data provided by the messages of the first type.

According to FIG. 7, the method for managing navigation data streams 302 furthermore comprises, executed at each computation cycle by each i-th authorization unit from among the K authorization units, second, third and fourth steps 306, 308, 310.

During the second step 306, each i-th authorization unit determines a mode of activity of the i-th computation centre CPF#i in the SBAS system 102 from among a single master mode, a first-backup mode, and a reserve backup mode.

The master mode authorizes a single computation centre CPF#m, placed in this mode from among the K computation centres, to transmit its generated data streams NOF m.j to the N broadcasting ground stations NLES#j, j varying from 1 to N.

The first-backup mode prohibits a single computation centre placed in this mode from transmitting its data streams to the broadcasting ground stations NLES#j, j varying from 1 to N, but authorizes the said computation centre to toggle to master mode when a persistent fault has been detected on the computation centre CPF#m previously in master mode in one or more previous computation phase(s).

The reserve backup mode which can be used when K is greater than or equal to 3 prohibits the computation centre placed in this mode from transmitting its data streams to the broadcasting ground stations NLES#j, j varying from 1 to N, but authorizes the said computation centre to toggle to first-backup mode when an absence of computation centre placed in first-backup mode has been detected.

The mode of activity of the i-th computation centre CPF#i is determined as a function of the knowledge of the computation centre currently in master mode and in the process of transmitting towards the broadcasting stations, of the regular knowledge of the operating states in terms of absence or existence of faults with the computation centres of the remote sites and of their mode of activity, of the quality of reception of the messages transmitted to the broadcasting stations when the authorization unit is in master mode, and of the quality of the messages actually transmitted by the geostationary satellites and received by the radioelectric receiver corresponding to the authorization unit.

During the third step 308, for i varying from 1 to K, as a function of the mode of activity determined, the i-th authorization unit remains in the previous mode of activity if the mode of activity determined is identical to it, or toggles to the mode of activity determined if it is different from the previous mode of activity determined in the previous computation phase.

During the fourth step 310, for i varying from 1 to K, on the basis of the mode of activity determined in the second step 306, the i-th authorization unit authorizes the i-th computation centre to transmit or prohibits it from transmitting its data streams towards the N broadcasting ground stations. It authorizes transmission when the mode of activity determined is the master mode and prohibits the i-th computation centre CPF#i from transmitting when the mode of activity determined is a backup mode.

The second step 306 of determining the mode of activity comprises fifth, sixth and seventh steps 322, 324, 326.

During the fifth step 322, each i-th authorization unit monitors the good reception of return messages dispatched by the broadcasting ground stations acknowledging receipt of the messages transmitted by the single authorization unit placed in master mode to all the computation centres through the first communications network.

During the sixth step 324, each i-th authorization unit monitors if necessary the operating states of the computation centres of the remote sites and their mode of activity through maintenance messages originating from the remote authorization units.

During the seventh step 326, each i-th authorization unit monitors if necessary the messages actually broadcast by the geostationary satellites to confirm or otherwise an absence of repetitivity of a fault.

During the fifth step 322, after having checked good reception of the return messages from the broadcasting ground stations and in case such a check is successful, each i-th authorization unit monitors the origin of the messages NOF m.j previously transmitted in terms of the rank m of the computation centre which transmitted them. In the case where the rank of the i-th authorization unit and the rank m of the monitored origin of the messages are identical, the mode of activity determined of the i-th computation centre is the master mode. In the case where the rank of the i-th computation centre and the rank m of the monitored origin of the messages are different, the mode of activity determined is a backup mode identical to the previous one.

In case of failure of a good reception of the return messages originating from the broadcasting ground stations, or when a communication problem of the i-th computation centre with which the i-th authorization unit is associated is detected, the i-th authorization unit considers that a communication fault exists between its site i and the site or sites of the broadcasting ground stations, and then monitors, in the sixth step 324, good communication, ensured by the first communications network 140, with the remote authorization units.

During the sixth step 324 and according to a first case 334, when the mode of activity at the previous cycle of the i-th authorization unit is the first-backup mode or a reserve backup mode and when a maintenance message, received from a remote authorization unit of a remote redundant site, confirms that the latter is operating in master mode, the current mode of activity determined of the i-th authorization unit is the previous backup mode.

During the sixth step 324 and according to a second case 336, when the mode of activity at the previous cycle of the i-th authorization unit is the master mode and when the maintenance messages received from the remote authorization units of the remote redundant sites confirm that the latter are operating in backup mode, the i-th authorization unit is assured during the seventh step 326 of the non-repetitivity of the fault with the link with the broadcasting stations by checking the messages of the stream NOFm.j actually transmitted by the geostationary satellites and received by the associated i-th radioelectric receiver. When, by comparison with the message NOFi.j of the i-th authorization unit, transmitted to the associated broadcasting station, the message NOFj actually transmitted by the stationary satellite of rank j indicates a recurrent fault with the i-th authorization unit, the mode of activity determined of the i-th authorization unit becomes a reserve backup unit which must be repaired and this change of state is indicated in a maintenance message of the i-th computation centre. In the case of a non-recurrence of fault, an untimely communication loss being considered, the i-th authorization unit is afforded a second chance to transmit a message correctly, and the current mode of activity determined of the i-th authorization unit remains the master mode.

During the sixth step 324 and according to a third case, when the i-th authorization unit does not receive any maintenance message originating from the unit for authorizing first backup of a redundant site and when an intersite link fault on the first communication network is confirmed at the level of the local site of the authorization unit, and when the mode of activity at the previous cycle of the i-th authorization unit is the master mode (previous m is equal to i), the i-th authorization unit is assured of the non-repetitivity of this fault in the seventh step 326 by checking the message NOF m.j actually transmitted by the geostationary satellites and received by the associated radioelectric receiver. When, by comparison with the messages NOF m.j of the m-th computation centre transmitted to the associated broadcasting stations, the message NOF m.j actually transmitted by the geostationary satellites indicate a recurrent fault with the i-th computation centre previously in master mode, the i-th authorization unit changes mode and its current determined mode is a reserve backup mode. In the case of a non-recurrence of the fault, an untimely communication loss being considered, the i-th computation centre is afforded a second chance to transmit a message correctly and the current mode of activity determined by the i-th unit is the master mode.

The number of cycles that may be considered to be untimely faults is tailored according to integrity and availability criteria specific to the SBAS system.

When the second number K of computation centres of the space based or aeronautical augmentation system is equal to 2, the first backup mode is used as sole backup mode. For i varying from 1 to 2, each i-th computation centre CPF#i comprises:

an i-th radioelectric receiver, located on the i-th site associated with the i-th computation centre, and an i-th unit for authorizing the i-th computation centre to transmit the N data streams NOF i.j according to the index j to the N broadcasting ground stations (NLES#j).

Each i-th authorization unit from among the two authorization units is configured so as, at each computation cycle, to determine a mode of activity of the i-th computation centre in the SBAS system from among a master mode and a backup mode. The master mode authorizes the single computation centre (CPF#m) placed in this mode from among the two computation centres to transmit the data streams NOF m.j generated to the N broadcasting ground stations NLES#j, j varying from 1 to N. The backup mode prohibits the computation centre placed in this mode from transmitting its data streams to the broadcasting ground stations but authorizing the said computation centre to toggle to master mode when a persistent fault in the computation centre currently in master mode has been detected The mode of activity of the i-th computation centre is determined as a function of the knowledge of the computation centre currently in master mode and in the process of transmitting towards the broadcasting stations, of the regular knowledge of the operating states in terms of absence or existence of faults with the computation centres of the remote sites and of their mode of activity, and of the quality of reception of the messages transmitted to the broadcasting stations, and of the quality of the messages actually transmitted by the space based or aeronautical broadcasting means and received by the radioelectric receiver corresponding to the authorization unit.

Each i-th authorization unit from among the two authorization units is configured so as, at each computation cycle, to:

as a function of the mode of activity determined, either remain in the previous mode of activity if the mode of activity determined is identical to it, or toggle into the mode of activity determined if it is different from the previous mode of activity; and as a function of the mode of activity determined, authorize the i-th computation centre to transmit or prohibit it from transmitting its data streams towards the N broadcasting ground stations.

In general, a number W, greater than or equal to N, of broadcasting stations share in transmission the N broadcasting means, each broadcasting means being associated with at least one broadcasting station and each broadcasting station being associated with a single broadcasting means. For example, W can be equal to 2N, and a different pair of broadcasting stations is associated with a different broadcasting means.

In general, the satellites GEO#j, j varying from 1 to N, of the single-channel SBAS system of FIGS. 2 to 6 can be replaced with space based or aeronautical broadcasting means, included in the set composed of geostationary satellites, satellites with polar and/or high elliptical orbits or HEO ("High-Elliptical Orbit"), satellites with mean orbits or MEO ("Medium-Earth Orbit"), satellites with low orbits or LEO ("Low-Earth Orbit"), drones, balloons and aircraft.

The reception of the streams of messages actually retransmitted by the space based or aeronautical broadcasting means with the aid of radioelectric receivers located within the computation centres is required as soon as a minimum configuration is used at two remote sites so as to decrease the reaction time for detecting a problem in the streams of messages broadcast via a shorter transmission loop (computation centre—broadcasting ground stations—space based or aeronautical broadcasting means—computation centre).

The invention claimed is:

1. A space based or aeronautical augmentation system, configured for improving a precision and reliability of data delivered by a global satellite navigation system comprising:
   a space based or aeronautical segment having a first integer number N, greater than or equal to two, of space based or aeronautical broadcasting means, furnished respectively with transmit/receive means configured for transmitting data received respectively from associated broadcasting ground stations, destined for one and a same predetermined geographical zone;
   a ground infrastructure segment comprising:
      N transmission ground stations, associated respectively with the N space based or aeronautical broadcasting means so as to transmit navigation data to the N space based or aeronautical broadcasting means and numbered respectively by a first integer index j varying from 1 to N, and
      at least one observation and reception ground station for signals transmitted by at least one satellite of the global satellite navigation system and by the N space based or aeronautical broadcasting means,
   a second number K, greater than or equal to 2, of computation centres, made mutually redundant, numbered respectively by a second index i varying from 1 to K, and configured to compute, on a basis of the signals transmitted by the observation and reception ground station or stations, streams or sequences of navigation messages NOF i.j, i varying from 1 to K and j varying from 1 to N, that are ready to be transmitted respectively according to the index j to N broadcasting ground stations;
   at least two of the K computation centres being located respectively on geographically mutually remote sites linked by a first communications network,
   the at least one reception and observation ground station, the N broadcasting ground stations being connected to the K computation centres respectively by a second communications network and a third communications network,
   the space based augmentation system (SBAS) being wherein:
      the K computation centres are each configured to formulate a string of N i-th parallel streams of messages NOF i.j, j varying from 1 to N, such that the string of all the streams of messages NOF i.j, independently of the computation centre which formulate them, comprises one and the same temporal sequence of types of messages MTs (Message Types) and which is independent of the space based or aeronautical broadcasting means, and
      the types of messages MTs of the sequence lying in a predetermined set {Tm} of types of navigation message contents Tm.

2. The space based or aeronautical augmentation system according to claim 1, wherein the K computation centres are configured so that at each current computation cycle of the messages, a single computation centre, taken from among the K computation centres, is selected and authorized to transmit to the broadcasting ground stations the current messages NOF m.j, m denoting the index of the computation centre selected at the current computation cycle and the selected computation centre being considered to be a master computation centre of the augmentation system during the said current computation cycle.

3. The space based or aeronautical augmentation system according to claim 1, wherein each computation centre CPF#i is configured so that contents of N data streams NOF i.j that the said computation centre CPF#i generates differ only by the content of messages,
   wherein the content of messages relates to predicted or recently measured trajectories of the N space based or aeronautical broadcasting means.

4. The space based augmentation system according to claim 1, wherein
   each computation centre CPF#i is configured so that the contents of two data streams NOF i.j1, NOF i.j2, that the said computation centre CPF#i formulates in parallel and which are intended for two different space based or aeronautical broadcasting means (j1≠j2), which differ only by a content of the messages of a first type having content relating to ephemerides data of one or more space based or aeronautical broadcasting means, and/or by a content of the messages of a second type having content relating to navigation data of a space based or aeronautical broadcasting means that are more precise than the ephemerides data provided by the messages of the first type.

5. The space based or aeronautical augmentation system according to claim 4, wherein the messages are defined by an international standards document: RTCA MOPS DO-229-D, entitled "Minimum Operational Performance Standards for Global Positioning System/Wide Area Augmentation Equipment",
   wherein the first type of message is denoted as "MT17"; and
   wherein the second type of message is denoted as "MT9".

6. The space based or aeronautical augmentation system according to claim 1, wherein each computation centre is configured so that all the data streams that it generates share one and the same algorithm, implemented for processing of GNSS and SBAS data received by the at least one observation station and for the formulation of all the streams of the data entailing one and the same scheduling of types of messages MTs and the same contents of a majority of the messages from which majority are excluded messages of a first type of message MT relating to ephemerides data of one or more space based or aeronautical broadcasting means, and/or messages of a second type of message MT relating to navigation data of a space based or aeronautical broadcasting means that are more precise than the ephemerides data provided by the messages of the first type of message.

7. The space based or aeronautical augmentation system according claim 1, wherein the space based or aeronautical broadcasting means lie in the set composed of GEO geostationary satellites, HEO satellites, MEO satellites, LEO satellites, drones, balloons and aircraft.

8. The space based or aeronautical augmentation system according to claim 1, wherein the second number K of computation centres is equal to 2; and for i varying from 1 to 2, each i-th computation centre CPF# i comprises:
an i-th radioelectric receiver, located on the i-th site associated with the i-th computation centre, and
an i-th unit for authorizing the i-th computation centre to transmit N data streams NOF i.j according to the index j to the N broadcasting ground stations; and
each i-th authorization unit from among the two authorization units being configured to
at each computation cycle,
determine a mode of activity of the i-th computation centre in the SBAS system from among a master mode and a backup mode,
the master mode authorizing the single computation centre placed in this mode from among the two computation centres to transmit the data streams NOF m.j generated to the N broadcasting ground stations NLES#j, j varying from 1 to N,
the backup mode prohibiting the computation centre placed in this mode from transmitting its data streams to the broadcasting ground stations but authorizing the said computation centre to toggle to master mode when a persistent fault in the computation centre currently in master mode has been detected;
the mode of activity of the i-th computation centre being determined as a function
of the knowledge of the computation centre currently in master mode and in the process of transmitting towards the broadcasting stations;
of the regular knowledge of the operating states in terms of absence or existence of faults with the computation centres of the remote sites and of their mode of activity; and
of the quality of reception of the messages transmitted to the broadcasting stations; and
of the quality of the messages actually transmitted by the space based or aeronautical broadcasting means and received by the radioelectric receiver corresponding to the authorization unit; and
as a function of the mode of activity determined, either remain in the previous mode of activity if the mode of activity determined is identical to it, or toggle into the mode of activity determined if it is different from the previous mode of activity;
as a function of the mode of activity determined, authorize the i-th computation centre to transmit or prohibit it from transmitting its data streams towards the N broadcasting ground stations.

9. The space based or aeronautical augmentation system according to claim 8, wherein each i-th authorization unit is configured to:
monitor the good reception of return messages dispatched by the broadcasting ground stations acknowledging receipt of the messages transmitted by the authorization unit through the third communications network; and
monitor the operating states of the computation centres of the remote sites and their mode of activity through the first communications network; and
monitor the messages actually broadcast by the space based or aeronautical broadcasting means so as to confirm or otherwise an absence of repetitivity of a link fault.

10. The space based or aeronautical augmentation system according to claim 1, wherein the number K of computation centres is greater than or equal to 3; and for i varying from 1 to K, each i-th computation centre CPF# i comprises:
an i-th radioelectric receiver, located on the i-th site associated with the i-th computation centre, and
an i-th unit for authorizing the i-th computation centre to transmit N data streams NOF i.j according to the index j to the N broadcasting ground stations; and
each i-th authorization unit from among the K authorization units being configured to
at each computation cycle,
determine a mode of activity of the i-th computation centre in the SBAS system from among a single master mode, a first-backup mode, and a reserve backup mode,
the master mode authorizing the single computation centre placed in this mode from among the K computation centres to transmit the data streams NOF m.j generated to the N broadcasting ground stations NLES# j, j varying from 1 to N,
the first-backup mode prohibiting the computation centre placed in this mode from transmitting its data streams to the broadcasting ground stations but authorizing the said computation centre to toggle to master mode when a persistent fault in the computation centre currently in master mode has been detected;
the reserve backup mode prohibiting the computation centre placed in this mode from transmitting its data streams to the broadcasting ground stations but authorizing the said computation centre to toggle to first-backup mode when an absence of computation centre placed in first-backup mode has been detected;
the mode of activity of the i-th computation centre being determined as a function
of the knowledge of the computation centre currently in master mode and in the process of transmitting towards the broadcasting stations;
of the regular knowledge of the operating states in terms of absence or existence of faults with the computation centres of the remote sites and of their mode of activity; and
of the quality of reception of the messages transmitted to the broadcasting stations; and
of the quality of the messages actually transmitted by the space based or aeronautical broadcasting means and received by the radioelectric receiver corresponding to the authorization unit; and
as a function of the mode of activity determined, either remain in the previous mode of activity if the mode of activity determined is identical to it, or toggle into the mode of activity determined if it is different from the previous mode of activity;
as a function of the mode of activity determined, authorize the i-th computation centre to transmit or prohibit it from transmitting its data streams towards the N broadcasting ground stations.

11. The space based or aeronautical augmentation system according to claim 1, wherein for i varying from 1 to K, each i-th computation centre furthermore comprises:
at least one i-th unit for processing and creating streams of navigation messages NOF i.j and at least one i-th unit for checking the integrity of the streams of navigation messages NOF i.j, varying from 1 to N;

the i-th computation centre being authorized to transmit the streams of messages when the integrity checks have been successful.

12. A method for managing navigation data streams of a space based or aeronautical augmentation system configured for improving a precision and reliability of data delivered by a satellite navigation system, the method comprising:
    implementing a space based or aeronautical segment having a first integer number N, greater than or equal to two, of space based or aeronautical broadcasting means, furnished respectively with transmit/receive means configured for transmitting data received from associated broadcasting ground stations, destined for one and a same predetermined geographical zone;
    implementing a ground infrastructure segment comprising:
    N transmission ground stations, associated respectively with the N space based or aeronautical broadcasting means so as to transmit navigation data to the N transmission ground stations and numbered respectively by a first integer index j varying from 1 to N, and
    at least one observation and reception ground station for signals transmitted by at least one satellite of the global satellite navigation system and by the N space based or aeronautical broadcasting means,
    implementing a second number K, greater than or equal to 2, of computation centres under redundancy, numbered respectively by a second index i varying from 1 to K, and configured to compute, on a basis of the signals transmitted by the reception ground station or stations, streams or sequences of navigation messages NOF i.j, i varying from 1 to K and j varying from 1 to N, that are ready to be transmitted respectively according to the index j to N broadcasting ground stations;
    at least two of the K computation centres being located respectively on geographically mutually remote sites linked by a first communications network,
    the at least one reception and observation ground station, the N broadcasting ground stations respectively, being connected to the K computation centres by a second communications network and a third communications network,
    the method for managing streams of navigation messages further comprising:
    a first step wherein:
        the K computation centres, i varying from 1 to K, each separately formulate a string of N parallel streams of navigation messages NOF i.j, j varying from 1 to N, wherein the string of all the data streams NOF i.j, independently of the computation centre which formulate them, comprises one and the same sequence of types of messages MTs, which is independent of the space based or aeronautical broadcasting means, the types of messages MTs of the sequence lying in a predetermined set {Tm} of types of navigation message contents Tm.

13. The method for managing streams of navigation messages of a space based or aeronautical augmentation system according to claim 12, wherein:
    the contents of two data streams NOF i.j1, NOF i.j2, formulated in parallel by any one and the same computation centre CPF i and intended for two different space based or aeronautical broadcasting means (j1≠j2), which differ only by a content of the messages of a first type having content relating to ephemerides data of one or more space based or aeronautical broadcasting means, and/or by a content of the messages of a second type having content relating to navigation data of a space based or aeronautical broadcasting means that are more precise than the ephemerides data provided by the messages of the first type.

14. The method for managing streams of navigation messages of a space based or aeronautical augmentation system according to claim 12, wherein the method further comprises:
    implementing, for i varying from 1 to K, each i-th computation centre CPF i to comprise:
    an i-th radioelectric receiver, located on the i-th site associated with the i-th computation centre, and
    an i-th unit for authorizing the i-th computation centre to transmit the N data streams NOF i.j according to the index j to the N broadcasting ground stations NLES j;
    the method further comprising:
    a second step wherein each i-th authorization unit determines in a current computation phase a current mode of activity in the augmentation system from among a single master mode and a backup mode,
    the master mode authorizing the single computation centre CPFm placed in this mode from among the K computation centres to transmit the data streams NOF m.j generated to the N broadcasting ground stations NLES j,
    the backup mode prohibiting the computation centre placed in this mode from transmitting its data streams to the broadcasting ground stations but authorizing the said computation centre to toggle to master mode in a manner coordinated with other computation centres if appropriate when a persistent fault in the computation centre currently in master mode has been detected;
    the mode of activity of the i-th computation centre being determined as a function;
    of the knowledge of the computation centre currently in master mode and in the process of transmitting towards the broadcasting stations;
    of the regular knowledge of the operating states in terms of absence or existence of faults with the computation centres of the remote sites and of their mode of activity;
    of the quality of reception of the messages transmitted to the broadcasting stations; and
    of the quality of the messages actually transmitted by the space based or aeronautical broadcasting means and received by the radioelectric receiver corresponding to the authorization unit; and
    a third step wherein, for i varying from 1 to K, as a function of the mode of activity determined, the i-th authorization unit remains in the previous mode of activity if the mode of activity determined is identical to it, or toggles into the mode of activity determined if it is different from the previous mode of activity; and
    a fourth step, wherein for i varying from 1 to K, as a function of the mode of activity determined, the i-th authorization unit authorizes the i-th computation centre to transmit or prohibits it from transmitting its data streams towards the N broadcasting ground stations.

15. The method for managing streams of navigation messages of a space based or aeronautical augmentation system according to claim 14, wherein the second step of determining the mode of activity comprises fifth, sixth, seventh steps,
    each i-th authorization unit monitoring in the fifth step the good reception of return messages dispatched by the broadcasting ground stations acknowledging receipt of the messages transmitted by the i-th authorization unit through the third communications network; and each i-th authorization unit monitoring if necessary in the sixth step the operating states of the computation centres of the remote sites and their mode of activity through maintenance messages originating from the remote authorization units; and each i-th authorization unit monitoring if necessary in the seventh step the messages actually broadcast by the space based or aeronautical broadcasting means so as to confirm or otherwise an absence of repetitivity of a fault.

\* \* \* \* \*